US006835782B1

(12) United States Patent  
Morita et al.

(10) Patent No.: US 6,835,782 B1  
(45) Date of Patent: Dec. 28, 2004

(54) METHOD FOR CURING FLUOROPOLYMER

(75) Inventors: Shigeru Morita, Settsu (JP); Takuya Arase, Settsu (JP); Tetsuo Shimizu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/030,914

(22) PCT Filed: Jul. 13, 2000

(86) PCT No.: PCT/JP00/04698

§ 371 (c)(1),  
(2), (4) Date: Jan. 14, 2002

(87) PCT Pub. No.: WO01/05881

PCT Pub. Date: Jan. 25, 2001

(30) Foreign Application Priority Data

Jul. 14, 1999 (JP) .......................... 11-200266

(51) Int. Cl.$^7$ ................................ C08F 8/32
(52) U.S. Cl. ..................... 525/326.3; 525/378
(58) Field of Search .............. 525/326.3, 378

(56) References Cited

U.S. PATENT DOCUMENTS

| | | | |
|---|---|---|---|
| 3,546,186 A | 12/1970 | Gladding et al. | |
| 3,933,767 A | 1/1976 | Nottke | |
| 3,978,030 A | 8/1976 | Resnick | |
| 4,399,264 A | 8/1983 | Squire | |
| 4,431,786 A | 2/1984 | Squire | |
| 4,525,539 A | 6/1985 | Feiring | |
| 6,203,912 B1 * | 3/2001 | Watakabe et al. | 428/421 |
| 6,221,970 B1 * | 4/2001 | Morken et al. | 525/326.3 |
| 6,281,296 B1 * | 8/2001 | MacLachlan et al. | 525/326.3 |

FOREIGN PATENT DOCUMENTS

| | | | |
|---|---|---|---|
| EP | 0 708 084 A1 | 4/1996 | |
| EP | 969023 A2 | 1/2000 | |
| JP | 59-108546 A | 6/1984 | |
| JP | 63-238115 | 4/1988 | |
| JP | 63-238111 | 10/1988 | |
| JP | 3-172311 A | 7/1991 | |
| JP | 5-117418 | 5/1993 | |
| JP | 5-502899 A | 5/1993 | |
| JP | 5-49692 | 7/1993 | |
| JP | 5-230151 A | 9/1993 | |
| JP | 8-119926 A | 5/1996 | |
| JP | 8-120146 A | 5/1996 | |
| JP | 8-217742 A | 8/1996 | |
| JP | 10-110079 A | 4/1998 | |
| JP | 10237130 A * | 9/1998 | C08F/114/18 |
| JP | 11-302394 A | 11/1999 | |

* cited by examiner

Primary Examiner—Bernard Lipman  
(74) Attorney, Agent, or Firm—Birch, Stewart, Kolasch & Birch, LLP

(57) ABSTRACT

A polymer having a structure of the formula:

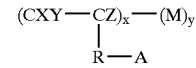

in which X, Y and Z represent independently each other H, F, Cl, Br or I, provided that at least one of X, Y and Z is F; R represents a straight or branched fluorinated alkylene group which may contain an oxygen atom; x and y represent mole percentages and x is from 1 to 100% by mole; A is —CN, —NCO, —COOR' in which R' is H or an alkyl group having 1 to 10 carbon atoms, an acid anhydride group or an unsaturated hydrocarbon group; and M is a repeating unit derived from a copolymerizable monomer is treated with a crosslinking agent selected from ammonia, diamines and polyol compounds and crosslinked through the side functional groups of the polymer. This crosslinking method can be carried out at room temperature and provides a transparent fluoropolymer having better heat resistance than conventional transparent thermoplastic resins.

9 Claims, No Drawings

METHOD FOR CURING FLUOROPOLYMER

This application is the national phase under 35 U.S.C. §371 of PCT International Application No. PCT/JP00/04698 which has an International filing date of Jul. 13, 2000, which designated the United States of America.

FIELD OF THE INVENTION

The present invention relates to a method for curing a fluorine-containing polymer. In particular, the present invention relates to a method for curing a curable fluorine-containing polymer having functional groups on side chains, which is curable at room temperature.

PRIOR ART

Transparent fluororesins having a cyclic structure are disclosed as transparent fluororesins in U.S. Pat. No. 3,978,030, JP-B-5-49692, JP-A-5-117418, JP-A-63-238111, JP-A-63-238115, etc. However, those fluororesins are all thermoplastic resins and their heat resistance has its own limit.

U.S. Pat. Nos. 3,546,186 and 3,933,767 disclose a method for producing a crosslinked rubber by introducing a fluorinated cyano group to a side chain and trimerizing it.

However, transparent fluororesins, which can be cured at room temperature and additionally thermally cured, are not known.

DISCLOSURE OF THE INVENTION

One object of the present invention is to provide a method for curing a fluorine-containing polymer at room temperature to form a transparent fluororesin having better heat resistance than conventional transparent thermoplastic resins.

The above object is achieved by a method for curing a fluorine-containing polymer having a structure of the formula:

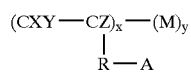
(I)

wherein X, Y and Z represent independently from each other a hydrogen atom, a fluorine atom, a chlorine atom, a bromine atom or an iodine atom, provided that at least one of X, Y and Z is a fluorine atom; R represents a straight or branched fluorinated alkylene group having 1 to 20 carbon atoms which may contain an oxygen atom; x and y represent mole percentages and x is from 1 to 100% by mole; A is —CN, —NCO, —COOR' in which R' is a hydrogen atom or an alkyl group having 1 to 10 carbon atoms, an acid anhydride group or an unsaturated hydrocarbon group; and M is a repeating unit derived from a copolymerizable monomer comprising treating said polymer with at least one compound selected from the group consisting of ammonia, diamines and polyol compounds and crosslinking said polymer through the side functional groups of said polymer, and a method for curing a fluorine-containing polymer having a structure of the formula:

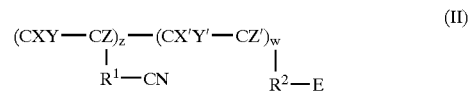
(II)

wherein X, Y, Z, X', Y' and Z' represent independently from each other a hydrogen atom, a fluorine atom, a chlorine atom, a bromine atom or an iodine atom, provided that at least one of X, Y and Z is a fluorine atom; $R^1$ and $R^2$ represent independently each other a straight or branched fluorinated alkylene group having 1 to 20 carbon atoms which may contain an oxygen atom; z and w represent mole percentages and z is from 1 to 100% by mole; and E is an organic group other than —CN comprising curing said polymer in the presence of a base.

Among the monomers (III) constituting the structure (I) represented by the formula:

(III)

wherein X, Y, Z, R and A are the same as defined above, a fluorine containing allyl ether nitrile of the formula (III) in which A is —CN and R is a fluorinated alkylene group containing an oxygen atom is a known compound and disclosed in JP-A-10-237130 together with the synthesis process thereof.

The monomer of the formula (II), in which A is a functional group other than —CN, that is, A being —NCO, —COOR', an acid anhydride group or an unsaturated hydrocarbon group, is a known compound or may be easily prepared by a known synthesis process.

Preferred examples of the acid anhydride group as the group A in the formula (I) include

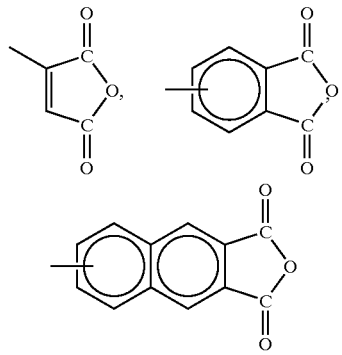

etc. and preferred examples of the unsaturated hydrocarbon group include —OCF=CF$_2$, —CF=CF$_2$, —CH=CH$_2$, etc.

Preferred examples of the fluorinated alkylene group represented by R include —[CF$_2$OCF(CF$_3$)]$_a$—, —(CF$_2$OCF$_2$CF$_3$)$_a$— wherein a is a number of 1 to 4, —(CF$_2$)$_b$— wherein b is a number of 1 to 20, etc.

The comonomer M which constitutes the structure of the formula (I) may be any monomer copolymerizable with the monomer (II). Preferred examples of the comonomer include vinylidene fluoride, tetrafluoroethylene, hexafluoropropylene, chlorotrifluoroethylene, vinyl fluoride, trifluoroethylene, tetrafluoropropylene, trifluoropropylene, ethylene, propylene, etc.

As described above, the polymer to be cured by the method of the present invention has at least one functional group selected from the group consisting of —CN, —NCO, —COOR', an acid anhydride group and an unsaturated hydrocarbon group in the molecule, preferably —CN (cyano group).

For example, J. Org. Chem., Vol. 32, 2237 describes that a cyano group readily reacts with ammonia to form an amidine or an imidoylamidine. The present invention utilizes this reaction to cure the fluorine-containing polymer of the formula (I).

Since the reaction of the cyano group with ammonia readily proceeds at room temperature, a colorless transparent cured product having elasticity can be obtained by simply allowing the polymer having the cyano group in contact with gaseous ammonia.

When A is —NCO, —COOR', an acid anhydride group or an unsaturated hydrocarbon group, the curing reaction proceeds by the addition of an alcohol or an amine to —NCO, amination through the reaction of —COOR' with an amine, amidation or imidation through the reaction of the acid anhydride with an amin, or the addition of an alcohol or an amine to the unsaturated hydrocarbon group.

Examples of a diamine to be used as a crosslinking agent include $H_2N$—R"—$NH_2$ wherein R" is an alkylene group having 1 to 20 carbon atoms,

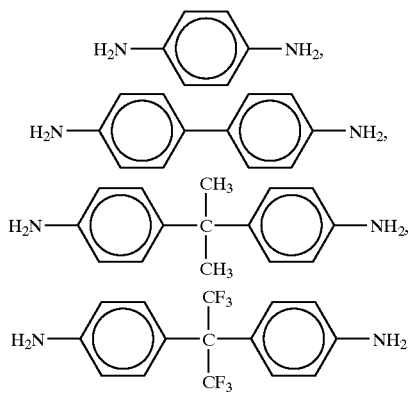

etc.

Examples of the polyol compound include

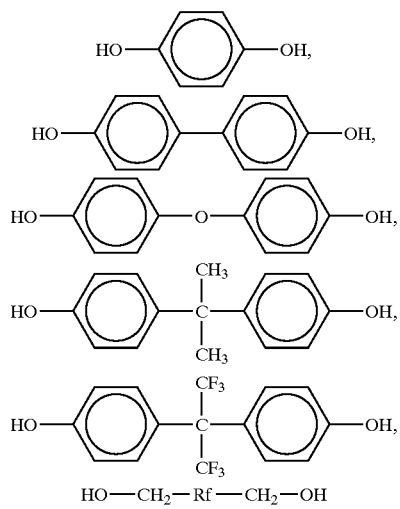

wherein Rf is a fluoroalkyl group having 1 to 20 carbon atoms.

The amount of the crosslinking agent to be used is half an equivalent of the functional group A in the case of ammonia or an amine, or the hydroxyl group of the polyol is equivalent to the functional group A.

The cured product will form a triazine ring, etc. by further heating when the functional group A is a cyano group and the crosslinking agent is ammonia. Thus, the curing of the polymer further proceeds and the heat resistance of the cured product is improved.

The polymer of the formula (II) can be cured at room temperature in the presence of a base such as triethylamine, tributylamine, pyridine, etc.

In this case, the base may be compounded in the polymer, or allowed in contact with the cast film of the polymer.

The cured product obtained by such a method is also colorless and transparent. The hardness of the cured product may be freely adjusted by the adjustment of the amount of the base to be used. The cured product obtained in such a way will form a triazine ring by heating like the above case so that the curing of the polymer further proceeds and the heat resistance of the cured product is improved.

Examples of the fluorinated alkylene group represented by $R^1$ or $R^2$ in the formula (II) are the same as those of R.

Examples of the organic group other than —CN represented by E include the functional groups represented by A (except a cyano group), and also other organic groups such as straight or branched alkyl groups having 1 to 20 carbon groups in which a part or all of the hydrogen atoms may be substituted with a chlorine atom or a fluorine atom, or the alkyl chair may contain an oxygen atom.

The heating temperature is usually at least 100° C., preferably at least 150° C. In general, the heating temperature may not be higher than 300° C.

The heating atmosphere is not limited. The heating may be carried out in an air or an atmosphere of an inert gas such as nitrogen.

The cured product obtained from the polymer according to the present invention may be used as a material for producing a sheath of an optical fiber, an antireflection film, an interlaminar insulation film, etc. in the electronic field or the optical field.

EXAMPLES

The present invention will be illustrated by the following examples.

Example 1

In an egg-plant type 50 ml flask, $CH_2$=$CFCF_2OCF(CF_3)$ $CF_2OCF(CF_3)CN$ (5.01 g) and a 8 wt. % solution of [$H(CF_2CF_2)_3COO$] (herein referred to as "DHP") in perfluorohexane (0.5 g) as a radical polymerization initiator were charged and cooled with a dry ice-acetone mixture. Then, the atmosphere in the flask was evacuated and replaced with nitrogen three times, and finally pressurized to atmospheric pressure with nitrogen. After sealing the flask, the content in the flask was stirred at 20° C. for 24 hours to carry out polymerization.

After the completion of the polymerization, the atmosphere in the flask was released to the air, and the remaining monomer was removed under reduced pressure at 50° C. A soft polymer (4.22 g) was left in the flask.

According to IR analysis, it was confirmed that the polymer was the homopolymer of $CH_2$=$CFCF_2OCF(CF_3)$ $CF_2OCF(CF_3)CN$. The viscosity [η] of the solution of this homopolymer in dichloropentafluoroethane was 0.067 at 35° C. The glass transition temperature of the homopolymer was 7.5° C. according to DSC analysis.

A solution of the polymer obtained in dichloropentafluoroethane (concentration: 10 wt. %) was prepared and casted on a rock salt plate, and allowed in contact with ammonia gas in a glass vessel at room temperature for 3 days. In the IR chart of the polymer film formed, the absorption at 2250 cm$^{-1}$ assigned to the cyano group decreased while the absorption peaks assigned to imidoylamidine were found around 1640 cm$^{-1}$, 1605 cm$^{-1}$, 1520 cm$^{-1}$, 3490 cm$^{-1}$ and 3340 cm$^{-1}$. When the film was peeled from the rock salt plate, the colorless, transparent and hard film with elasticity was obtained.

Example 2

The film obtained in Example 1 was further heated in an air at 150° C. for 2 days. Then, in the IR chart, the absorption at 2250 cm$^{-1}$ assigned to the cyano group further decreased, and the absorption assigned to the triazine ring newly appeared around 1550 cm$^{-1}$.

When the film was heated at 250° C. for another 2 days, the absorption at 2250 cm$^{-1}$ assigned to the cyano group almost disappeared, while the absorption around 1550 cm$^{-1}$ assigned to the triazine ring increased. The film obtained was colorless and transparent, and its hardness increased.

The thermal decomposition starting temperature of this cured film in the air was 302.1° C., the 10% decomposition temperature was 350° C., and the 50% decomposition temperature was 392° C.

Example 3

The polymer obtained in Example 1 (0.3 g) was dissolved in dichloropentafluoropropane (5 ml), and the solution was poured in a laboratory dish having a diameter of about 4.3 cm, which was placed on a horizontal plate. Then, the solvent was evaporated off to obtain a polymer film having a thickness of about 100 μm. This film was treated with ammonia gas in the same way as in Example 1 to obtain a colorless, transparent and hard film with elasticity.

A contact angle of water on this cured film was 98.5 degrees.

According to DMA (Dynamic Mechanical Analysis), the modulus of elasticity was 1.45×10$^{10}$ dyn/cm$^2$ at 33.7° C., 1.97×10$^7$ dyn/cm$^2$ at 254.6° C., and 1.50×10$^7$ dyn/cm$^2$ at 226.8° C.

When this cured film was heated in the air at 250° C. for 2 hours, a colorless, transparent and harder film was obtained after cooling.

A contact angle of water on this cured film after heating was 99.2 degrees.

Example 4

Triethylamine (10 mg) was added to the polymer obtained in Example 1 (about 1 g) and mixed with a spatula. After the mixture was kept standing at room temperature for 1 day, a cured material was obtained.

Triethylamine was applied on the uncured polymer film obtained in Example 3 (thickness: about 100 μm), and kept standing one day. Then, a colorless transparent film was obtained.

Example 5

CH$_2$=CFCF$_2$OCF(CF$_3$)CF$_2$OCF(CF$_3$)CF$_2$OCF(CF$_3$)CN (5 g) and a 8 wt. % solution of DHP in trichlorotrifluoroethane (0.5 g) as a polymerization initiator were charged in the flask and polymerized in the same manner as in Example 1

After the completion of the polymerization, the atmosphere in the flask was released to the air, and the remaining monomer was removed under reduced pressure at 50° C. A soft polymer (4.11 g) was left in the flask.

The glass transition temperature of this polymer was −34.5° C. according to DSC analysis.

The polymer obtained (0.3 g) was dissolved in dichloropentafluoropropane and poured in a laboratory dish having a diameter of about 4.3 cm, which was placed on a horizontal plate. Then, the solvent was evaporated in the air at room temperature to obtain a polymer film having a thickness of about 100 μm. This film was treated with ammonia gas in the same way as in Example 1 to obtain a colorless, transparent and hard film with elasticity.

What is claimed is:

1. A method for curing a fluorine-containing polymer having a structure of the formula:

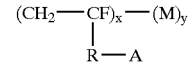

wherein R represents a straight or branched fluorinated alkylene group having 1 to 20 carbon atoms which optionally contains an oxygen atom; x and y represent mole percentages and x is from 1 to 100% by mole; A is —CN, —NCO, —COOR' in which R' is a hydrogen atom or an alkyl group having 1 to 10 carbon atoms, or A is an acid anhydride group or A is an unsaturated hydrocarbon group; and M is a repeating unit derived from a copolymerizable monomer;

wherein the method comprises treating said polymer with ammonia and crosslinking said polymer through the side functional groups of said polymer.

2. The method according to claim 1, wherein the crosslinked polymer is further heated at a temperature of at least 100° C.

3. A method for curing a fluorine-containing polymer having a structure of the formula:

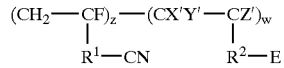

wherein X', Y' and Z' represent independently from each other a hydrogen atom, a fluorine atom, a chlorine atom, a bromine atom or an iodine atom; R$^1$ and R$^2$ represent independently from each other a straight or branched fluorinated alkylene group having 1 to 20 carbon atoms which optionally contains an oxygen atom; z and w represent mole percentages and z is from 1 to 100% by mole; and E is —NCO, —COOR' in which R' is a hydrogen atom or an alkyl group having 1 to 10 carbon atoms, an acid hydride group, an unsaturated hydrocarbon group, a straight or branched alkyl group having 1 to 20 carbon atoms in which a part or all of the hydrogen atoms are optionally substituted with a chlorine atom or a fluorine atom or the alkyl group optionally contains an oxygen atom;

wherein the method comprises curing said polymer in the presence of a base.

4. The method according to claim 3, wherein R$^1$ is a group of the formula:

wherein Rf is a fluorinated alkylene group having 1 to 20 carbon atoms.

5. The method according to claim 3 or 4, wherein said cured polymer is further heated at a temperature of at least 100° C.

6. A method for curing a fluorine-containing polymer having a structure of the formula:

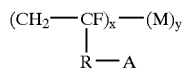

wherein R is a group of the formula: —CF$_2$ORf— in which Rf is a fluorinated alkylene group having 1 to 20 carbon atoms which may contain an oxygen atom; x and y represent mole percentages and x is from 1 to 100% by mole; A is —CN, —NCO, —COOR' in which R' is a hydrogen atom or an alkyl group having 1 to 10 carbon atoms, or A is an acid anhydride group or A is an unsaturated hydrocarbon group; and M is a repeating unit derived from a copolymerizable monomer;

wherein the method comprises treating said polymer with at least one compound selected from the group consisting of ammonia, diamines and polyol compounds and crosslinking said polymer through the side functional groups of said polymer.

7. The method according to claim 6, wherein said cured polymer is further heated at a temperature of at least 100° C.

8. The method according to claim 1, wherein M is selected from the group consisting of vinylidene fluoride, tetrafluoroethylene, hexafluoropropylene, chlorotrifluoroethylene, vinyl fluoride, trifluoroethylene, tetrafluoropropylene, trifluoropropylene, ethylene, and propylene.

9. The method according to claim 6, wherein M is selected from the group consisting of vinylidene fluoride, tetrafluoroethylene, hexafluoropropylene, chlorotrifluoroethylene, vinyl fluoride, trifluoroethylene, tetrafluoropropylene, trifluoropropylene, ethylene, and propylene.

* * * * *